(12) United States Patent　　(10) Patent No.: US 10,120,985 B2
Kocher et al.　　(45) Date of Patent: Nov. 6, 2018

(54) PROTECTING MEDIA ITEMS USING A MEDIA SECURITY CONTROLLER

(71) Applicant: CRYPTOGRAPHY RESEARCH, INC., San Francisco, CA (US)

(72) Inventors: Paul C. Kocher, San Francisco, CA (US); Helena Handschuh, Palo Alto, CA (US)

(73) Assignee: Cryptography Research, Inc., Sunnyvale, CA (US)

(*) Notice: Subject to any disclaimer, the term of this patent is extended or adjusted under 35 U.S.C. 154(b) by 0 days.

(21) Appl. No.: 14/415,568

(22) PCT Filed: Jul. 17, 2013

(86) PCT No.: PCT/US2013/050947
§ 371 (c)(1),
(2) Date: Jan. 16, 2015

(87) PCT Pub. No.: WO2014/015073
PCT Pub. Date: Jan. 23, 2014

(65) Prior Publication Data
US 2015/0178478 A1　Jun. 25, 2015

Related U.S. Application Data

(60) Provisional application No. 61/673,023, filed on Jul. 18, 2012, provisional application No. 61/683,679, filed on Aug. 15, 2012.

(51) Int. Cl.
*G06F 21/10*　(2013.01)
(52) U.S. Cl.
CPC ...... *G06F 21/10* (2013.01); *G06F 2221/0724* (2013.01)

(58) Field of Classification Search
CPC .................. G06F 21/10; G06F 2221/0724
See application file for complete search history.

(56) References Cited

U.S. PATENT DOCUMENTS 5,504,892 A * 4/1996 Atsatt ............... G06F 17/30067
　　　　　　　　　　　　　　　　　707/822
6,185,666 B1 * 2/2001 Murray ................. G06F 3/0607
　　　　　　　　　　　　　　　　　711/173

(Continued)

FOREIGN PATENT DOCUMENTS

WO　　　　00-56068 A1　9/2000
WO　　WO-2000-056068 A1　9/2000

OTHER PUBLICATIONS

PCT International Search Report dated Oct. 8, 2013 in International Application No. PCT/US2013/050947. 18 pages.

(Continued)

*Primary Examiner* — Saleh Najjar
*Assistant Examiner* — Devin E Almeida
(74) *Attorney, Agent, or Firm* — Lowenstein Sandler LLP

(57) ABSTRACT

A media storage device includes a media security controller and a memory to store data that relates to a media item to be rendered by a rendering device. The media security controller sends a message in response to the rendering device reading an authorization file. The message being for the rendering device to read a portion of data from the memory and to provide the portion of data to the media security controller. The media security controller receives the portion of the data from the rendering device, transforms the portion of the data, and sends the transformed portion of the data to the rendering device.

30 Claims, 8 Drawing Sheets

(56) References Cited

U.S. PATENT DOCUMENTS

| | | | |
|---|---|---|---|
| 6,615,365 B1* | 9/2003 | Jenevein | G06F 11/1417 711/161 |
| 6,772,340 B1* | 8/2004 | Peinado | G06F 21/10 380/201 |
| 8,640,219 B2* | 1/2014 | Zhang | G06F 21/10 713/151 |
| 2004/0093396 A1* | 5/2004 | Akune | G06F 17/30017 709/219 |
| 2005/0086501 A1* | 4/2005 | Woo | G06F 21/10 713/189 |
| 2006/0123246 A1 | 6/2006 | Vantalon et al. | |
| 2006/0171535 A1* | 8/2006 | Omae | G06F 21/10 380/201 |
| 2006/0277607 A1* | 12/2006 | Chung | G06F 21/10 726/27 |
| 2007/0124313 A1* | 5/2007 | Kim | G06F 21/10 |
| 2007/0276760 A1 | 11/2007 | Kanehara et al. | |
| 2008/0140433 A1 | 6/2008 | Levy et al. | |
| 2010/0310076 A1* | 12/2010 | Barzilai | G06F 21/10 380/278 |
| 2010/0333209 A1 | 12/2010 | Alve | |
| 2011/0007903 A1 | 1/2011 | Robert et al. | |
| 2012/0087639 A1* | 4/2012 | Kawaguchi | H04N 5/913 386/252 |

OTHER PUBLICATIONS

PCT Int'l. Preliminary Report on Patentability dated Jan. 29, 2015 re PCT/US2013/050947. 12 pages.

EP Extended European Search Report dated Feb. 11, 2016 re EP Appln. No. 13820051.4. 7 Pages.

EP Response with EP Appln. No. 13820051.4 to the Extended EP Search Report dated Feb. 11, 2016 and the Communication Pursuant to Rules 70(2) and 70a(2) EPC dated Mar. 1, 2016 filed on Aug. 23, 2016. 7 pages.

Chinese Office Action dated Aug. 15, 2017, on application No. 201380037869.7.

* cited by examiner

PROTECTING MEDIA ITEMS USING A MEDIA SECURITY CONTROLLER

RELATED APPLICATIONS

This application claims the benefit of PCT Application No. PCT/US2013/050947 filed Jul. 15, 2013, which claims the benefit of U.S. Provisional Application No. 61/673,023, filed Jul. 18, 2012 and U.S. Provisional Application No. 61/683,679, filed Aug. 15, 2012, which are incorporated by reference.

TECHNICAL FIELD

The present disclosure relates to protecting media items and, more particularly, to a technique of protecting media items using a media security controller (MSC).

BACKGROUND

As downloading of content (e.g., movies, music, books, images, documents, etc.) in digital format becomes increasingly common as a method of content distribution, the issue of securing the content to prevent and/or to identify piracy has become of great concern to content producers (e.g., movie studios, record labels, book publishers, etc.). Traditional media storage devices may include a media security controller to ensure that a host device (e.g., media player) can access a media file in a public partition on the media storage device. Generally, media security controllers lack the capability to implement security features for limiting the rendering of a media item. Conventionally, authorization keys and security are managed by the host device. The host device typically stores the authorization keys to enable decryption and playback of the media file(s). Traditional solutions offer limited security in that if the host device is compromised (e.g., hacked) the authorization keys may be used by other devices, and such attacks are not limited or blocked by media.

BRIEF DESCRIPTION OF THE DRAWINGS

The present disclosure will be understood more fully from the detailed description given below and from the accompanying drawings of various implementations of the disclosure.

DETAILED DESCRIPTION

A system and method for protecting media items involving a media security controller (MSC) is described, according to various implementations. A rendering device may obtain media data from the media storage device, but may not be independently able to interpret the media data. In order to understand the media data, the rendering device can forward the media data to a MSC, and the MSC can transform (e.g., decrypt, encrypt, compress, etc.) the media data to allow the rendering device to interpret the media data. In this way, a rendering device's ability to render a media file depends on its interactions with the MSC. Unlike conventional media controllers, MSC implementations add security intelligence to media devices, and the MSC acts as an intermediary between a rendering device and a media file to be rendered. Also unlike traditional media controllers, MSC implementations can internally store and manage authorization keys for media items including those stored on the media itself. For example, the MSC can provide the rendering device with information (e.g., obtained by using an authorization key in a security operation) that the rendering device should use to render the media file. In another example, the MSC can decrypt a portion of the media file for the rendering device and can provide the decrypted portion to the rendering device (e.g., to be played directly, combined with other data, further decrypted, etc.). Systems using MSCs allow content providers (e.g., media publishers, distributors) to ensure a MSC is involved in the rendering process. For example, a publisher may configure the licensing of a media item such that a portion of the media item or one of the media data decryption keys are decrypted by the MSC.

Examples of a media item can include, and are not limited to, digital movies, digital video, digital photos, digital music, website content, social media updates, electronic books (ebooks), electronic magazines, digital newspapers, digital audio books, electronic journals, web blogs, real simple syndication (RSS) feeds, electronic comic books, software applications, etc.

A media item can be consumed via the Internet or other networks (such as by streaming the media item from a media device to a remote device) and/or more directly via an application or locally-connected device. For brevity and simplicity, a digital movie (also hereinafter referred to as a movie) is used as an example of a media item throughout this document. As used herein, "digital content," "media," "media item," "online media item," "digital media," and a "digital media item" can include an electronic file that can be played, executed or loaded using software, firmware, and/or hardware configured to present the media item to a user.

Figure 1:
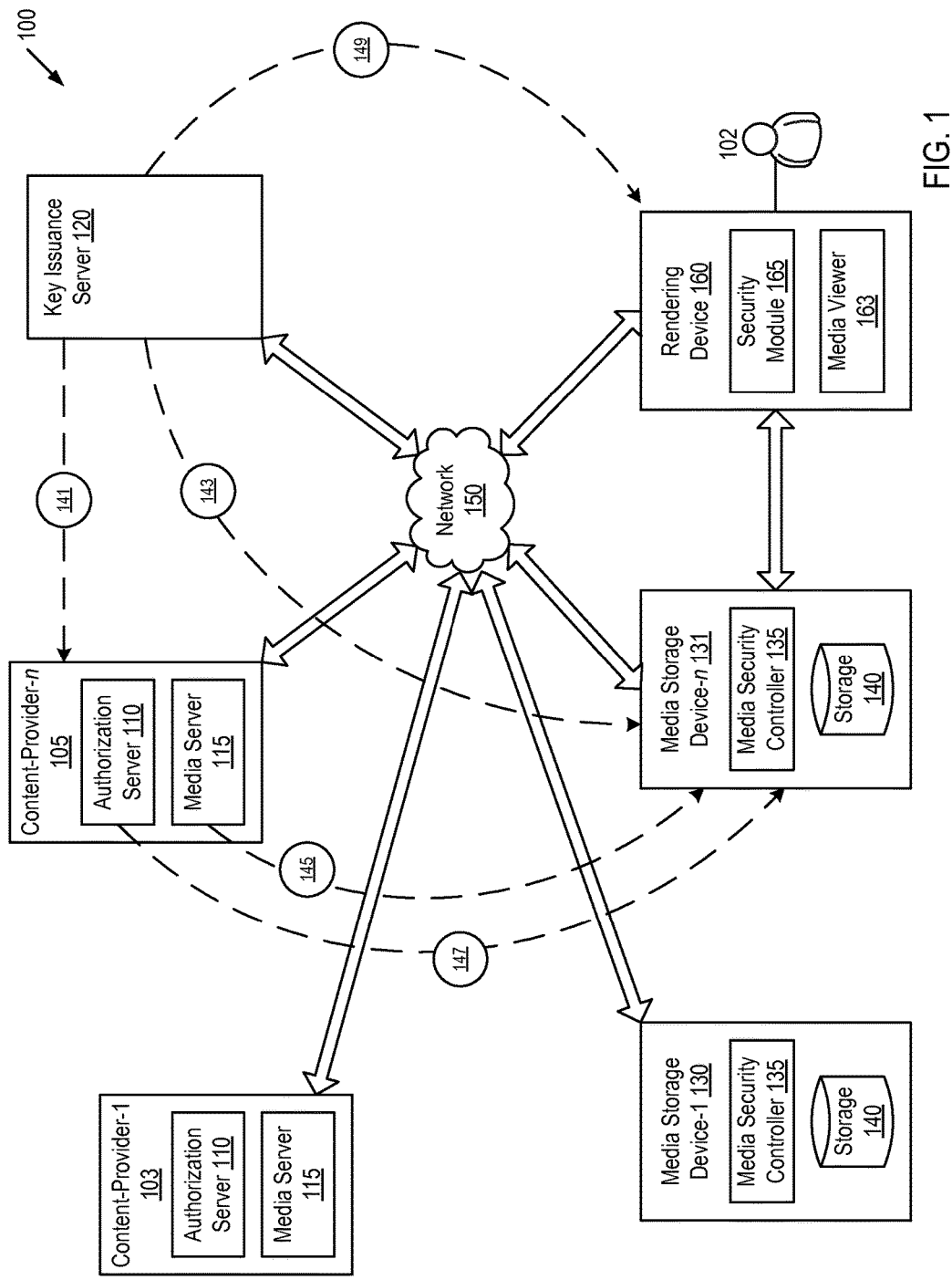
FIG. 1 illustrates example system architecture, in accordance with one or more implementations.

FIG. 1 illustrates example system architecture 100, in accordance with various implementations. The system architecture 100 can include one or more servers 110,115 associated with one or more content providers 103,105 (e.g., media item publishers), one or more key issuance servers 120, one or more media storage devices 130,131, and one or more rendering devices 160 coupled via one or more networks 150.

The one or more networks 150 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof.

The rendering devices 160 can include devices to render media items, and may be (but are not limited to) portable media players, netbooks, laptop computers, electronic book readers, tablet computers, desktop computers, set-top boxes, gaming consoles, televisions, cellular telephones, personal digital assistants (PDAs), and the like. The rendering device 160 functionality may be implemented in hardware or software, or a combination thereof. The rendering device 160 can also be implemented in a component, such as a graphics card/accelerator, media interface, or conditional access device. The rendering device 160 may be controlled by a remote control, a touch screen, a keyboard, a mouse, gesture input, or any other input device. The rendering device 160 may have Internet (or other network) connectivity and the connectivity may be sporadic. (For example, network connectivity may be required to download content or authorize transfers of content between devices, but may not be required during playback so as to permit playback in offline or low-bandwidth environments). The rendering device 160 can internally contain cryptographic keys and security logic, as well as the ability to interface with media and output video to the user. The rendering device 160 can include video decompression support (e.g., an MPEG2, H.264 and/or HEVC codec), as well as the ability for the user to select and manage various video streams (e.g., a menuing system, which can be rudimentary such as the system employed in the DVD format or more sophisticated and/or programmable capabilities such as BD-J employed on Blu-ray).

The individual rendering devices 160 can include a media viewer 163. In one implementation, the media viewers 163 are applications that allow users to view media items, such as movies, etc. For example, the media viewer 163 may include video decoding capabilities (e.g., codecs for MPEG-2, MPEG-4/H.264, VC-1, or other compression standards), and audio decoding capabilities. Media viewer 163 may, in some implementations, include user interface elements so the user can select or interact with content to play, and may include a web browser that can access, retrieve, present, and/or navigate content (e.g., web pages such as Hyper Text Markup Language (HTML) pages, digital media items, etc.) contained on media storage device 131 or from other sources (e.g., web servers).

The media viewer 163 can render, display, and/or present the content (e.g., a web page, a media viewer) to a user. The media viewer 163 may be an embedded media player (e.g., a Adobe Flash player or an HTML5 player) that is embedded in a document (e.g., a web page). The media viewer 163 may also include dedicated hardware elements, such as dedicated decoders implemented in silicon, e.g. as part of a larger SoC (System on Chip) and/or as standalone chip(s). In another example, the media viewer 163 may be a standalone application or a capability of a standalone application (e.g., a mobile application, desktop application, gaming console application, television application, etc.) that allows users to view digital media items (e.g., movies). The media viewer 163 can be provided to the rendering devices 160 by a server and/or content distribution platform. For example, in some embodiments, a media viewer 163 may be an embedded media player that is embedded in a document (e.g., web pages) or movie file provided by the content distribution platform. In another example, the media viewers 163 may be separate applications that are downloaded from a server. In another example, the media viewers 163 may be standalone applications that are pre-installed on the rendering devices 160. The media viewer may be stored on media storage devices 130,131, or may be stored elsewhere.

The servers 110,115,120 can include one or more computing devices (such as a rackmount server, a router computer, a server computer, a personal computer, a mainframe computer, a laptop computer, a tablet computer, a desktop computer, etc.), data stores (e.g., hard disks, SSDs, network-attached storage devices, memories, databases), networks, software components (operating systems, middleware, application software, databases, etc.), hardware security modules (e.g. PC cards, smart cards, USB security peripherals), and/or other components that may be used to provide a user with access to media items and/or provide the media items to the user.

The media storage device 130 can include at least one MSC 135 (such as a secure CPU (central processing unit) with internal ROM, keys, key storage, etc.) as well as storage 140 (such as flash memory or hard drives). A CPU is an example of a processing device. The MSC 135 can be a separate chip, or can be integrated with other functionality (such as a USB, flash, or hard disk controller). The bulk storage 140 can be implemented on separate hardware within the media from the MSC 135, or they could be integrated (e.g., as a single chip). Examples of physical form factors for the media storage device 130 include without limitation flash memory cards, USB sticks, hard disks, SSDs, network attached storage devices, etc. It should be noted that, depending on the embodiment, the MSC may or may not be aware of how data is organized on storage 140. If the MSC 135 lacks such awareness (as may be the case if the media storage device 130 is a block storage device using a file system that is not known to MSC 135), then the process involved for the MSC 135 to obtain data contained on storage 140 may include having the MSC 135 provide a message to the player (or host or rendering device) to read data from bulk storage, possibly decrypt the data, and send the data back to the media device. The storage 140 can store media items and data pertaining to the media items. The storage 140 can include one or more data stores that can be memory (e.g., random access memory), cache, drives (e.g., hard drive), flash drives, one-time programmable storage, or another type of component or device capable of storing data. The data stored on storage 140 is not limited to media files that utilize the security capabilities of MSC 135 (e.g., storage 140 can operate as a normal hard drive or flash drive, with standard file systems, and can hold any kind of data including both legacy files and files using MSC 135 for playback).

The MSC 135 can be part of or coupled (or otherwise directly or indirectly connected) to the rendering device 160. The MSC 135 can add security features to protect the media items that are stored in the storage 140. The MSC 135 can act as an intermediary component between the rendering device 160 and the movie in the storage 140 to be rendered, and can include functionality to assist in securing or enabling such rendering. For example, the rendering device 160 cannot render Action-Movie-XYZ in media viewer 163 without the MSC 135 processing some of the data needed to render Action-Movie-XYZ in media viewer 163. For example, the MSC 135 can decrypt one or more keys that should be used for rendering the media item and provide the keys to the rendering device 160, and/or decrypt precursors to actual decryption keys, and/or decrypt a portion of the media item and provide the decrypted portion to the rendering device 160. The interaction between the MSC 135 and the rendering device 160 can be iterative. The number of iterations can be based on instructions that relate to (and may be stored with) the media item.

The rendering device 160 can access the data (e.g., media items, data pertaining to the media items) in the storage 140. The data in the storage can be secured (e.g., encrypted) to prevent the rendering device 160 from rendering (whether by the stored data in the media viewer 163 or rendering by unauthorized devices) without use of the required security procedures. As noted previously, the rendering device 160 can include a security module 165 which can, directly or indirectly, exchange data with the MSC 135 to enable the processing and exchange of data to allow rendering in the media viewer 163.

In one implementation, the MSC 135 does not have the ability to directly read from files contained on storage 140. For example, MSC 135 may not understand the file system utilized by the rendering device 160. If the MSC 135 requires data from storage 140, the MSC 135 can send a message to rendering device 160 specifying the desired data, then rendering device 160 can obtain data from storage 140 and to provide the data back to the MSC 135. The MSC 135 can then, for example, utilize the data (e.g. as part of its own operation) or it may process the data and can send the processed data to the security module 165 (e.g. directly or by way of rendering device 160). The security module 165 can use the data from the MSC 135 to render the media item (e.g., movie) in the media viewer 163.

The rendering device 160 can be coupled to the media storage device 130 to access the media item (e.g., movie) in the storage 140 to render the media item in the media viewer 163. The rendering device 160 can include a security module 165, which can communicate (directly or indirectly) with the MSC 135. The security module 165 can be for example, and is not limited to, firmware, an application, a security core on a SoC, a separate chip, and/or other hardware in the rendering device 160. When a user 102 selects a movie to render in the media viewer 163, the security module 165 can load an authorization file for the movie from the storage 140. The authorization file can include one or more sets of instructions for the security module 165 and for the MSC 135 to execute in order to render the movie on the media viewer 163. The security module 165 can receive and interpret instructions from the MSC 135 and/or from the authorization file. Likewise, the MSC 135 can receive and interpret instructions from the security module 165 and/or from the authorization file.

The key issuance server 120 can distribute and manage keys for the rendering devices 160 and media storage devices 130,131. The key issuance server 120 can issue one or more base media storage device keys for the media storage devices 130,131. For example, when the media storage devices 130,131 are manufactured, the key issuance server 120 can supply (143) one or more base media storage device keys in the secure memory portion (e.g., in an on-chip one-time-programmable memory) of the MSC 135 of the media storage device 130,131. The base media storage device keys can be unique for each media storage device 130,131. Examples of a base media device key can include, and are not limited to, an asymmetric key pair (e.g., RSA/ECC), a symmetric key (AES keys), etc. The base media storage device keys can be used to establish a secure session with an authorization server 110, a rendering device 160, etc. The process of supplying a key can, for example, include having key issuance server 120 directly transmit the key in a secure facility, or keys can be delivered to a key programming device in a secure facility which then provides the key to individual devices, and/or the key can be sent in secured (e.g., encrypted) form over an untrusted channel such as the Internet.

The key issuance server 120 can issue one or more rendering device keys for the rendering devices 160. For example, when a rendering device 160 is manufactured, the key issuance server 120 can supply (149) one or more rendering device keys to the rendering device 160. The process of supplying a key can, for example, include having key issuance server 120 directly transmit the key in a secure facility, or keys can be delivered to a key programming device in a secure facility which then provides the key to individual devices, and/or the key can be sent in secured (e.g., encrypted) form over an untrusted channel such as the Internet.

The content provider 105 can include one or more media servers 115 to provide media items, for example, for a rendering device 160 to render for a user 102. The content provider 105 can include one or more authorizations servers 110 to provide authorization files for the media items to allow the media items to be rendered.

The authorization servers 110 can provision the authorization keys into MSCs 135. For example, when a movie is purchased (e.g. by user 102), the media server 115 can supply (145) a data file for the purchased movie that will be stored on the media storage device (e.g., Media-Storage-Device-n 131), and the authorization server 110 can send (147) an authorization file and an authorization key for the movie for storage on the media storage device. For example, when the movie is purchased, the data file, the authorization file, and the authorization key for the movie can be downloaded from the authorization server 110 and from the media server 115 to the storage 140 on the Media-Storage-Device-n 131. The authorization key can be stored in the MSC 135 (or encrypted with a key stored in the MSC 135 and stored elsewhere on storage 140), and the data file and the authorization file can be stored in storage 140. One implementation of storing the authorization keys in the MSC 135 is described in greater detail below in conjunction with FIG. 2.

The key issuance server 120 can provide data to authorization server 110 for use in preparing and/or encrypting authorization keys. In one implementation, the key issuance server 120 provides (141) to authorization server (110) a list of derived keys that are based on the base media storage device keys it supplies (143) to media storage devices (131). The derived keys can be used by authorization server 110 to securely transfer information (such as authorization keys) for use by MSCs 135. One implementation uses a key tree to produce the derived keys is described in greater detail below in conjunction with FIG. 6.

The authorization file can include sets of instructions and data for execution by the security module 165 on the rendering device 160 and the MSC 135 on the media storage device. For example, an exemplary authorization file's instructions can instruct the security module 165 to retrieve data that is encrypted from the storage 140 for the movie and to provide the encrypted data to the MSC 135. The exemplary authorization file can also include instructions for the MSC 135 to decrypt the encrypted data using the authorization key that is stored by the MSC 135, re-encrypt the data using a session key that is shared between the MSC 135 and the security module 165, and send the encrypted data to the security module 165 on the rendering device 160. The exemplary authorization file's instructions can specify which keys the MSC 135 should use to decrypt data and encrypt data.

Figure 2:
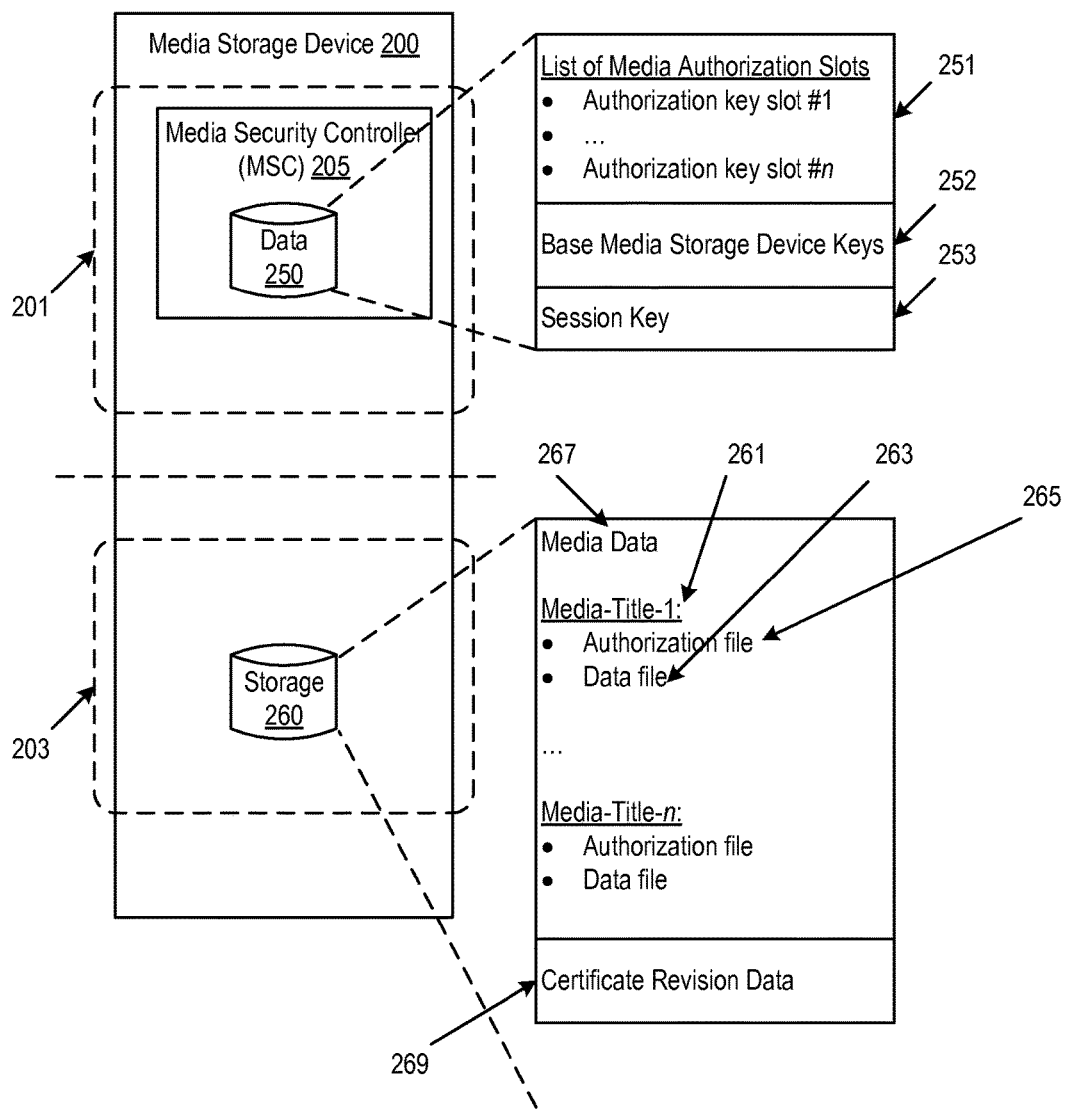
FIG. 2 illustrates an example media storage device, in accordance with one or more implementations.

FIG. 2 illustrates an example media storage device 200, in accordance with one or more implementations. The media storage device 200 can be the same as the media storage device 131 in FIG. 1. The media storage device 200 can include a secure private section 201 and a public section 203.

The public section 203 can include storage 260 usable to store media data 267 for one or more media items. For example, the media data 267 can include data for Media-Title-1 to Media-Title-n. For each media item, the media data 267 can include a media identifier (e.g., Media-Title-1 261), an authorization file 265, and a data file 263 that includes the main data (e.g., encrypted video and audio) to be rendered. One implementation of an authorization file is described in greater detail below in conjunction with FIG. 3. The media data 267 can be received from one or more servers (e.g., authorization server 110 in FIG. 1, media server 115 in FIG. 1) of a content provider (e.g., content provider 103,105 in FIG. 1). If public section 203 is organized in a file system, the foregoing data on it can be stored in file(s) along with unrelated files.

The public section 203 can store certificate revision data 269. The certificate revision data 269 can be received from a key issuance server (e.g., key issuance server 160 in FIG. 1) and/or an authorization server (e.g., authorization server 110 in FIG. 1). The certificate revision data 269 (e.g., certificate revision lists) can include information describing any revisions to the rights associated with the MSCs and/or rendering devices as described in the corresponding certificates. The certificates of the rendering devices include information describing, for example, and not limited to, the level of quality of media items which the rendering device can render. For example, a Rendering-Device-B may have a certificate that allows Rendering-Device-B to render media items in high-definition. If Rendering-Device-B is compromised (e.g., hacked, attacked, etc.), the certificate revision list may include information indicating that the certificate of Rendering-Device-B is revised such that Rendering-Device-B is authorized to render media items in low-definition and not in high-definition.

The certificate revision data 269 can be updated whenever a newer valid version is available. For example, the certificate revision data 269 can be updated when media items are downloaded to the media storage device 200. In another example, the certificate revision data 269 can be updated when the MSC 205 determines that the certificate revision data 269 is outdated. For example, when the MSC 205 establishes a secure session with a rendering device, the MSC 205 and the rendering device can compare the versions of each other's certificate revision lists to determine whether a certificate revision list is current or outdated. Digital signatures on certificate revision lists can authenticate both the validity and freshness of the underlying data (e.g., an issuance date or counter contained in the certificate revision list can enable devices to identify if a new version is valid and newer than the currently-stored version).

The private section 201 can store base media storage device keys 252. The base media device storage keys 252 can be received from a key issuance server (e.g., key issuance server 160 in FIG. 1) and stored in the private data area 250 of the MSC 205, for example, when the media storage device 200 is manufactured. The base media device storage keys 252 can include, for example, and are not limited to, an asymmetric key pair (e.g., RSA/ECC) and one or more AES keys. The base media storage device keys can be used in establishing a secure session with a rendering device and/or with the authorization servers.

The private section 201 can be a secure section and can include a MSC 205. The MSC 205 can store data 250 for protecting the media data 261 and the media items (e.g., movies) relating to the media data 261. The data 250 can include authorization data 251 used as part of the process of rendering corresponding media items in storage 260. The authorization data 251 can include, for example, and is not limited to a list of authorization key slots to store the authorization keys, authorization key slot numbers, and information (e.g., publisher identifier, authorization identifier, authorization key, etc.) for each slot. The media storage device 200 can use the authorization keys in the authorization data 251, for example, to decrypt data files 263 or portions of data files 263 or keys that have been used to encrypt portions of data files 263 in the media data 267. The data 250 in the private storage can also include, for example, signatures, certificates, an internal key (e.g., in on-chip flash/fuses/OTP), the timestamp or serial number of the latest verified certificate revision list, etc.

The data 250 in the private section 201 can include a session key 253 that is established between the MSC 205 and a security module (e.g., security module 165 in FIG. 1) in a rendering device (e.g., rendering device 160 in FIG. 1) for a particular secure communication session. The MSC 205 can use the session key 253 for securing communication with a security module (e.g., security module 165 in FIG. 1) in a rendering device. For example, the MSC 205 can receive data that is encrypted and/or authenticated by the security module and can use the session key 253 to decrypt and/or verify the data. In another example, the MSC 205 can encrypt and/or authenticate data using the session key 253 and can send the encrypted data to the security module for decryption and/or verification.

As noted previously, in some embodiments, the MSC 205 may not be able to directly access or interpret the media data 267 in the public section 203 on the media storage device 200. For example, the MSC 205 may not understand the file system used to organize data on storage 260. To obtain required data (such as portions of the media data 267), the MSC 205 can send messages to the rendering device to retrieve the required media data 267 from the storage 260 and to provide the media data 267 to the MSC 205. To ensure that the correct data is required, the MSC 205 can digitally hash the returned data and confirm that the resulting hash matches a digital signature and/or message authentication code.

For example, in one embodiment, when a movie (e.g., Media-Title-1 261) is selected to be rendered, the rendering device can retrieve the authorization file 265 for the movie (e.g., Media-Title-1 261) from the public section 203 on the media storage device 200 and send the authorization file 265 (or portions thereof) to the MSC 205. The authorization file portions can include one or more sets of digitally-signed instructions for the MSC 205 to execute. For example, an exemplary authorization file 265 for Media-Title-1 261 may include a set of instructions for the MSC 205 to derive a temporary key from a base media storage device key 271, use the temporary key to decrypt an encrypted key (which may also come from the authorization file 265) using a specified key in the instructions, then further decrypt the result using an authorization key matching an ID designated in the instructions. The exemplary instructions may then specify that the MSC 205 should use session key 253 to re-encrypt the result and to send the re-encrypted result to the security module on the rendering device. The exemplary authorization file 265 contains instructions for security module on the rendering device directing it to decrypt the re-encrypted result using the session key and use the result as a key to render portions of the data file 263 for the Media-Title-1 261 media item.

Figure 3:
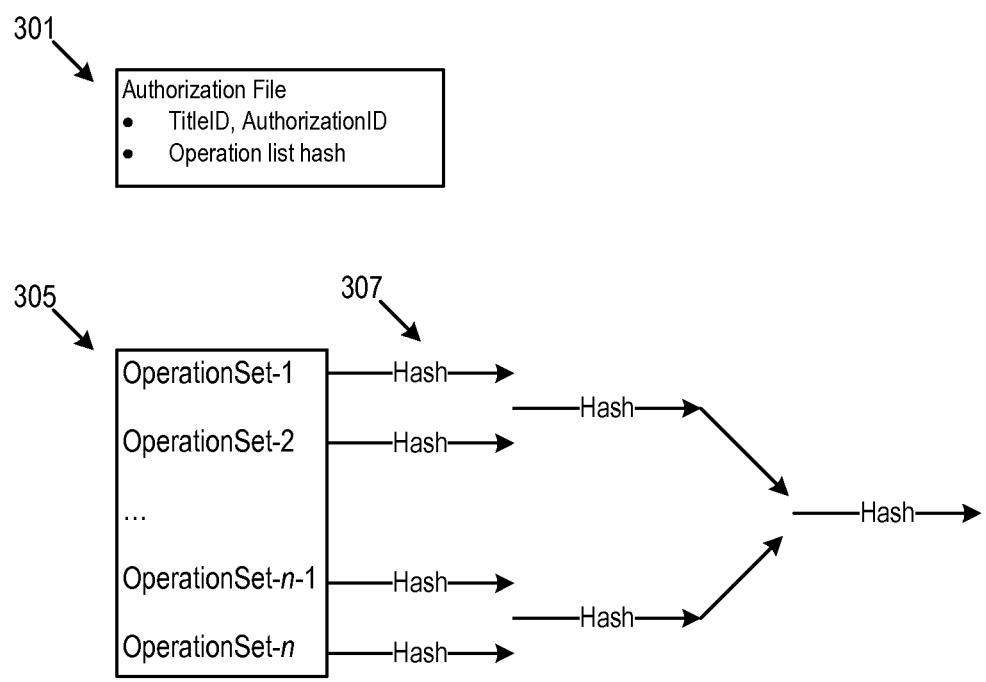
FIG. 3 illustrates example instructions in an authorization file for protecting a media item using a media security controller, according to various implementations.

FIG. 3 illustrates example instructions in an example authorization file 301 for protecting a media item using a media security controller, according to one exemplary implementation. The authorization file 301 can be the same as the authorization file 265 in FIG. 2.

The authorization file 301 can include one or more sets of instructions for the security module and for the MSC to execute in connection with rendering a media item. For example, the MSC may receive instructions to decrypt Data-XYZ, re-encrypt Data-XYZ, and send the re-encrypted Data-XYZ to the rendering device. In another example, the rendering device may receive instructions to wait to receive some data (i.e., encrypted Data-XYZ) from the MSC and to decrypt the encrypted Data-XYZ when the encrypted Data-XYZ is received.

The rendering device can include firmware for interpreting and executing the instructions. For example, when a media item is selected for rendering, the firmware on the rendering device may instruct the rendering device to automatically retrieve the authorization file 301 for the selected media item and to forward the authorization file 301 or portions thereof to the MSC. The MSC can receive the authorization file 301 or portions thereof from the rendering device and can authenticate and interpret the authorization file 301 or portions thereof.

There can be an authorization file 301 for each media item or a set of media items. The authorization file 301 can be pre-encoded to include media identifiers (e.g., title identifiers), authorization identifiers, and one or more sets of operations 305 for rendering the corresponding media item. The instructions can be configurable, e.g. for the corresponding media item(s). For example, a content provider (e.g., publisher) can define the instructions and associated encrypted data values. The content provider can provide different instructions each time a new authorization file is issued (e.g., when a user downloads some content and pays to have a license provided to the customer's media storage device). The set of operations 305 can include conditions or other branching/logic capabilities. For example, the set of operations 305 may include a conditional statement that if bit 17=1, use the key in a specified authorization key slot to decrypt some data.

In one implementation, the individual sets of operations 305 are hashed by devices prior to being performed. The hash of the set of operations (hashes 307) themselves are hashed in a way that connects the various individual sets of operations 305 into a hash that (though various stages of hashing) reflects all of the operations. In one embodiment, this is done with a hash tree. In another embodiment, operation sets include the hashes of subsequent operation sets. For example, OperationSet-1 (which has Hash-Value-1) references operations in OperationSet-2 and the reference in OperationSet-1 includes the hash of OperationSet-2. OperationSet-2 may reference both OperationSet-3 and OperationSet-4, and those references would also include the hashes of OperationSet-3 and OperationSet-4, respectively. In this way, a digital signature on Hash-Value-1 directly authenticates the contents of OperationSet-1, which in turn authenticate the other OperationSets. The next instruction set may include Hash-Value-2 which confirms the integrity of and chains to the next instruction set to execute, etc. In both of the foregoing embodiments, the total size of the instructions carried in an authorization file 301 can be substantially larger than the RAM available in the MSC and/or the security module, since each of the MSC and the security module (in the rendering device) receive their own portions of the instruction set and carry out the commands in their portions.

Examples of commands that may be contained within the instruction set are shown below:

Examples of Sample Instruction Types:
Encrypt (who, key select, offset)
Compress (who, key select, offset)
Copy (who, src, dest, len)
Decrypt (who, key select, offset)
Compare (who, src, dest, len, jump location, hash of instruction set at jump location)
Fill (who, dest, len, data)
Finish (who, status)
Indirect Step (who, ptr, hash)
Transfer (who, src, dest, len)
AES (key select, offset [source], offset [destination])
AddToPlaybackMap (who [must be Security Module], key select, offset [with playback map data to append])
Offset in main encrypted content file on storage
Keys include separate keys for audio and video to apply
Length of data in encrypted content file
Destination in virtual content file
ReceiveData(ptr, length)
DeriveKey(key select [in], derivation parameters, key select [out])

Note: In the input parameters, "who" designates which entity should perform the instruction (e.g., MSC or Security Module), and may be omitted if operations for each are isolated into separate sets. "Key select" identifies a key in the entity that should be used in the processing. "Offset" specifies an offset (e.g., slot location or byte offset) in a working area.

Figure 4:
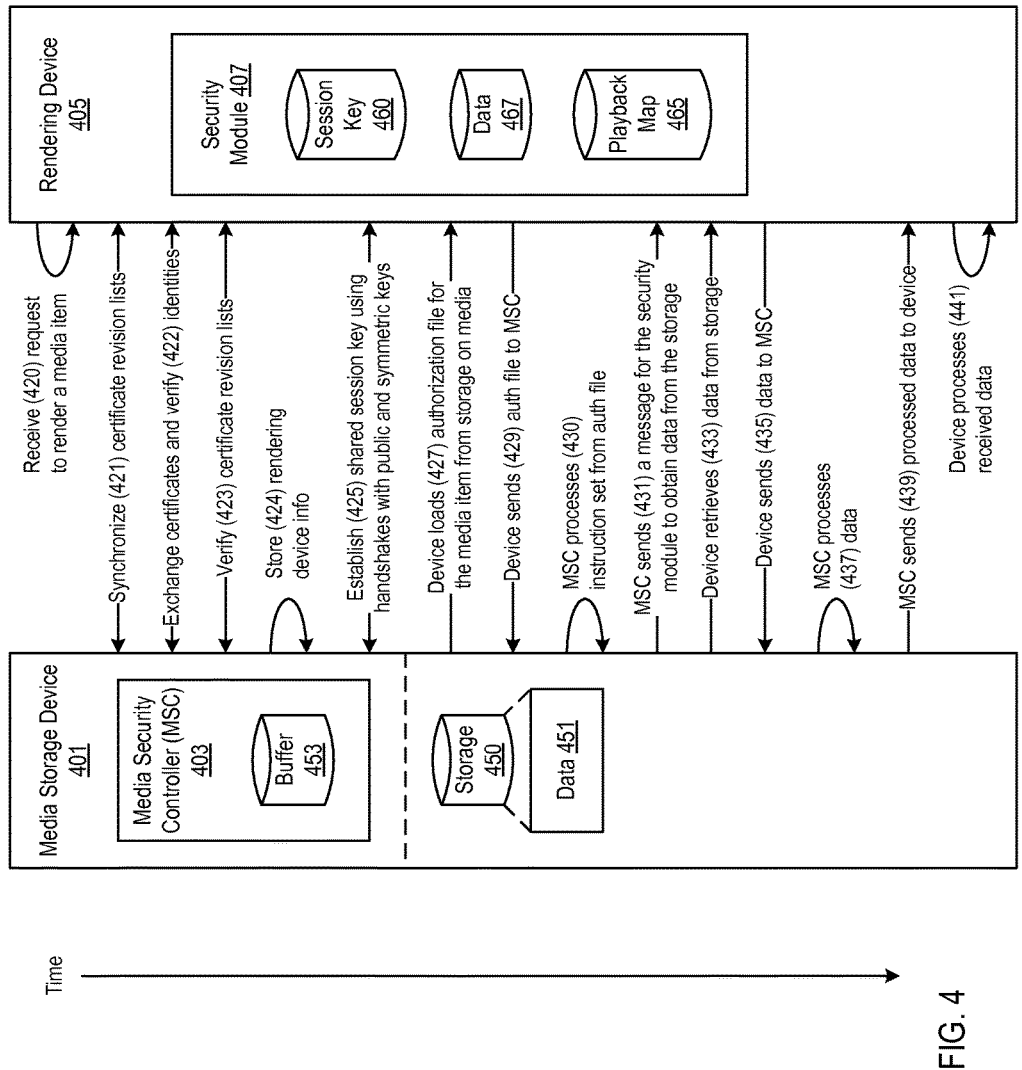
FIG. 4 is a diagram of an example of communications between a media storage device and rendering device for protecting a media item, according to various implementations.

FIG. 4 is a diagram of an example of a media security controller 403 interacting with a rendering device 405 to enable rendering of a media item, according to various implementations. For example, the media security controller 403 and the rendering device 405 can establish a secure session, create a session key, and use the session key and other keys to create a playback map 465, which the rendering device 405 may use to render a media item. The media storage device 401 can be the same as the media storage device 130 in FIG. 1 and media storage device 200 in FIG. 2. The rendering device 405 can be the same as the rendering device 160 in FIG. 1.

The rendering device 405 may receive (420) a request to render a media item that is stored in the data 451 in storage 450 on the media storage device 401. The request can be received as input of a user selection of the media item via a graphical user interface. For example, the request may be for Comedy-Movie-ABC. Either in response to, or prior to, the request, the rendering device initiates a secure session between the rendering device 405 and the media storage device 401.

In some embodiments, it is desirable that the newest available certificate revision list (CRL) be employed by both the media security controller 403 on the media storage device 401 and security module 407 on the rendering device 405. To enable synchronization of CRL versions, the MSC 403 and the security module 407 can each be configured to receive a CRL header, then check if the header both: (i) has a valid a digital signature signed by a trusted entity (e.g., the key issuance center), (ii) has an issuance counter (or timestamp) indicating that the CRL is newer than the newest CRL previously seen. If both are true, the newer CRL header is retained in a secure area and the entire CRL is stored on the destination device. If a newer CRL is being supplied to the media, it can be written by the rendering device as a file in the public file system. If a newer CRL is being supplied to the rendering device, it can be read from the media's file system and stored in a small flash, hard disk, or nonvolatile memory area in the rendering device. Thus, a process of synchronizing (421) certificate revision lists and headers can include first checking whether the newest CRL versions seen by the devices are the same and, if not, sending from the device with the newer CRL the newer CRL to the device with the older CRL. In addition, if desired, newer CRLs can also be sought over the Internet, from data on storage 451, or elsewhere (and, if a CRL is found that is newer than the latest seen by either device, then the new CRL should be supplied to both devices, as described above). Upon completion of CRL synchronization 421, both devices will then have the same CRL version.

At step 422, the media security controller 403 and the security module 407 exchange certificates that respectively specify the rendering device/media storage device identity, type/manufacturer, attributes, and public key. The devices verify that the certificates are properly signed, e.g. by verifying a chain of certificates initiating with the key issuance center.

Each device verifies and processes (423) a certification revision list portion corresponding to the other's identity. The CRL portion received can be compared against the CRL versions synchronized previously (421). Allowing CRLs to be in portions makes it simple to support CRL sizes in excess of the amount of RAM available on constrained environments such as MSC 403. In one embodiment, the rendering device 405 provides the necessary portions from the certificate revision file to the media security controller 403 for the media security controller 403 to verify the security module 407 identity. The MSC 403 can terminate the protocol if the received portion is not properly authenticated by a signature issued by the key issuance center, if the version does not match the version previously received, if the portion does not correspond to the security module's certificates, or if the portion revokes security module 407 (or otherwise makes security module 407 noncompliant with the content's requirements).

The MSC 403 stores (424) information from the certificate of the rendering device 405. For example, the media storage device 401 may allocate a fixed amount of memory (e.g., 16 Kbit) as buffer 453 and may populate the fixed sized buffer with the rendering device information (e.g., manufacturer, model, serial number, claimed class, revocation status from certificate revision list (CRL), revision status from CRL, etc.) from the certificate of the rendering device and/or the corresponding CRL portion(s). Although not shown in the figure, security module 407 likewise can form a buffer with information from the media storage device's certificates and/or corresponding CRL portion(s).

The MSC 403 and the security module 407 establish (425) a shared session key using a handshake with a set of public keys and a handshake with a set of symmetric keys. This session key can correspond to session key 253 in FIG. 2. The MSC 403 and the security module 407 can each derive and store the session key locally. For example, each can encrypt a random value with a public key from the other's certificate. The MSC 403 and the security module 407 can then exchange these encrypted values, then each decrypts the other's value. The session key can then be produced by hashing the decrypted results (e.g., hash(value encrypted by media||media certificates||value encrypted by rendering device||rendering device certificates), where "||" denotes concatenation). "Hash" can be a cryptographic hash function, such as SHA-256.

The rendering device 405 then loads (427) the authorization file, and sends (429) the relevant authorization file portions to the MSC 403.

The MSC 403 identifies its first instruction set in the authorization file and begins to process (e.g., reads, executes, etc.) (430) instructions. Depending on the set of instructions, the MSC 403 may have several iterations of exchanging and processing data with the security module 407 on the rendering device 405. For example, the MSC 403 may execute a first set of instructions, which instruct the MSC 403 to decrypt data that is included in the instruction set. For example, the instruction set may include an encrypted key and may specify the authorization key in the MSC 403 that should be used to decrypt the encrypted key.

The exemplary instruction set for the MSC in FIG. 4 includes an instruction for the MSC 403 to receive additional data from the rendering device 405. To process this instruction, the MSC 403 sends (431) a message to the security module 407 for the security module 407 to obtain additional data from the security module 407. The security module 407 retrieves (433) the data (e.g., from the storage 450 as shown, or other sources such as rendering device's internal memory, from the Internet, etc.) and sends (435) the data to the MSC 403 (or responds with an error). The MSC 403 processes 437 (e.g., decrypts and/or encrypts using keys produced earlier, such as during step 430) the data and sends (439) the processed data to the security module 407 (e.g., by providing the data to the rendering device which passes it along to the security module). The security module 407 processes (441) the received data. For example, the security module 407 may also receive further sets of instructions from the authorization file describing how the security module 407 should process the data. For example, the security module 407 can use a session key 460 to decrypt the received data, then apply a further decryption step using a key derived from a key from the key issuance center (see key distribution 149 in FIG. 1) and can store the result as part of data 467.

In another example, the security module 407 can use a session key 460 to decrypt the data and can store the decrypted data as part of the playback map 465. For example, the authorization file can include instructions for the security module 407 to write data (e.g., decrypted key, offset value, length, etc.) to a buffer that stores the playback map 465. The data placed in the playback map 465 can, without limitation, be derived using data received from the MSC 403, data from storage 450, data from media device certificates, data from rendering device certificates, data from CRLs, data from instructions, data retrieved from networks (such as the Internet), and any other data that may be available. For example, information from any of these sources can be used to select playback map entries that select among different alternate portions of the content (e.g. to achieve forensic marking). The sets of instructions associated with a title allow flexibility in how a given title will be decoded, and through this process the security module 407 can use data from many sources, and it may incrementally and/or iteratively receive data from the MSC 403 to construct the playback map 465.

For example, the authorization file may include instructions for the security module 407 to add an operation to the playback map 465. The operation can be executed by the security module 407. The playback map entry may also call for additional processing. For example, the entry may instruct the rendering device 405 and/or its security module 407 to interface with the MSC 403 at a point in time during rendering of the media item to receive assistance from the MSC 403, e.g. to convert a precursor value into a key that can then be used in rendering a portion of the media item.

For example, at communication 439, the authorization file can instruct the security module 407 to add an operation to the playback map 465 that requires communication with the MSC 403 when rendering the media item from offset range X through Y in the media item. The operation can include parameters, such as, and not limited to, an indicator to trigger communication by the security module 407 with the MSC 403, an offset, a length, etc. The assistance may be, for example, that the MSC 403 should decrypt the media file data at offsets X through Y.

The playback map 465 can be constructed using multiple communications from the MSC 465. For example, communications 431,433 may include instructions for the security module 407 to write to the playback map 465. For example, the instructions may direct the security module 407 to write to the playback map 465 an entry containing a Length, an Offset in the storage, and a Key Value. For example, the instructions may be for the security module 407 to write "The next [Length] bytes of the media should be read starting at offset [Offset] in the media file on the storage and should be decrypted with the key [Key Value]" to the playback map 465. In an alternate embodiments, other methods or encodings for specifying and selecting among different keys across the media item may be utilized, or there may be a single key for the entire media item.

The rendering device 405 can use the playback map 465 to render the media items. The playback map 465 can include information about how to locate and decrypt ciphertext making up the item, and is used by the security module 407 to form, decrypt, and render the media item. The playback map 465 can include (but is not limited to) the one or more keys that the rendering device 405 should use to decrypt the media item. When the rendering device 405 reads the data file for the media item from storage 450 and reaches a portion of the data file to be decrypted, the rendering device 405 can use a corresponding key in the playback map 465 to decrypt the portion of data. In another example, when the rendering device 405 reaches a portion of the data file to be decrypted, the rendering device 405 may read an instruction in the playback map 465 to contact the MSC 403 to help decrypt the portion of the data. Decryption of the data can use conventional cryptographic methods, such as AES in counter mode.

In one implementation, the security module 407 can start rendering a media item using a partially constructed playback map 465 and can continue to construct the playback map 465 based on further communications from the MSC 403. For example, the MSC 403 and the security module 407 can establish a secure session and can partially construct a playback map 465. The rendering device 405 may start to render the media item (e.g., movie) based on the partially constructed playback map 465. At various points while the rendering device 405 is playing a movie, the rendering device 405 may detect a portion of data which the rendering device 405 cannot decrypt and can interface with the media security module 403 to decrypt the portion of data. Rendering can also begin before the media item is completely downloaded, provided that the required data is present.

Content providers (e.g., publishers) may wish to identify which MSC and/or rendering device rendered a media item. For example, publishers may become aware of unauthorized copies of media items and/or devices (e.g., media storage devices, rendering devices) and may wish to trace which MSCs and/or rendering devices are associated with the unauthorized copies. Content providers can use the instructions in the authorization files and the execution of the instructions by the MSCs and/or rendering devices for forensic analysis to identify which MSCs and/or rendering devices rendered particular media items.

For example, content providers can select keys for decryption for particular media security controllers and/or rendering devices. When a rendering device and/or media security controller decrypts a media item, the result can vary depending on whether the authorized key was used. For example, the content providers can define and pre-encode the authorization files with instructions such that when a portion of a movie is played, different rendering devices have different playback map entries (e.g., one player may play generate key K1 in the playback map and use it to decrypt variant A of the portion, while another player may generate key K2 in the playback map and use it to decrypt variant B of the portion). If a pirated copy is recovered, the variant in the file conveys information about the pirate (e.g., if variant A is present then the pirate was able to decrypt variant A, if variant B is present then the pirate was able to decrypt variant B). Given enough variants, it is possible to convey any information. The size of a variant can be as small as a few bytes in the compressed video, or variants can be much longer (such as significant portions of video or audio data).

Figure 5:
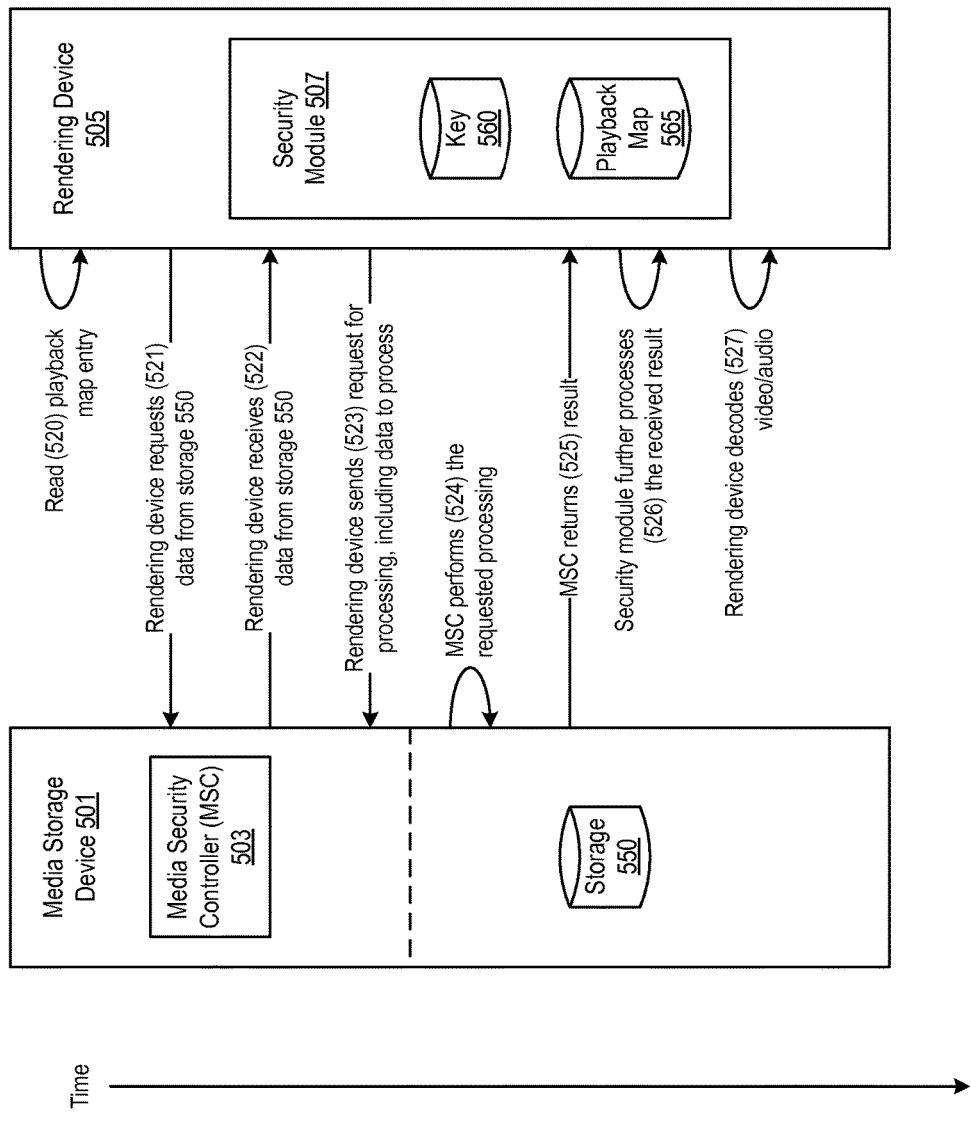
FIG. 5 is a diagram of an example of communications between a media storage device and rendering device for protecting a media item, according to various implementations.

FIG. 5 is a diagram of an example of a rendering device 505 using a playback map 565 and a media security controller (MSC) 503 to render a media item, according to various implementations. For example, an entry in the playback map 565 may instruct the rendering device 505 to seek assistance from the MSC 503 to render a corresponding portion of the media item (e.g., movie). In this way, the MSC 503 may actively participate during the rendering of the media item by decrypting a portion of the media item or by providing the rendering device with a key that can be used to decrypt at least the portion of the media item. The media storage device 501 can be the same as the media storage device 130 in FIG. 1 and media storage device 200 in FIG. 2. The rendering device 505 can be the same as the rendering device 160 in FIG. 1.

Figure 6:
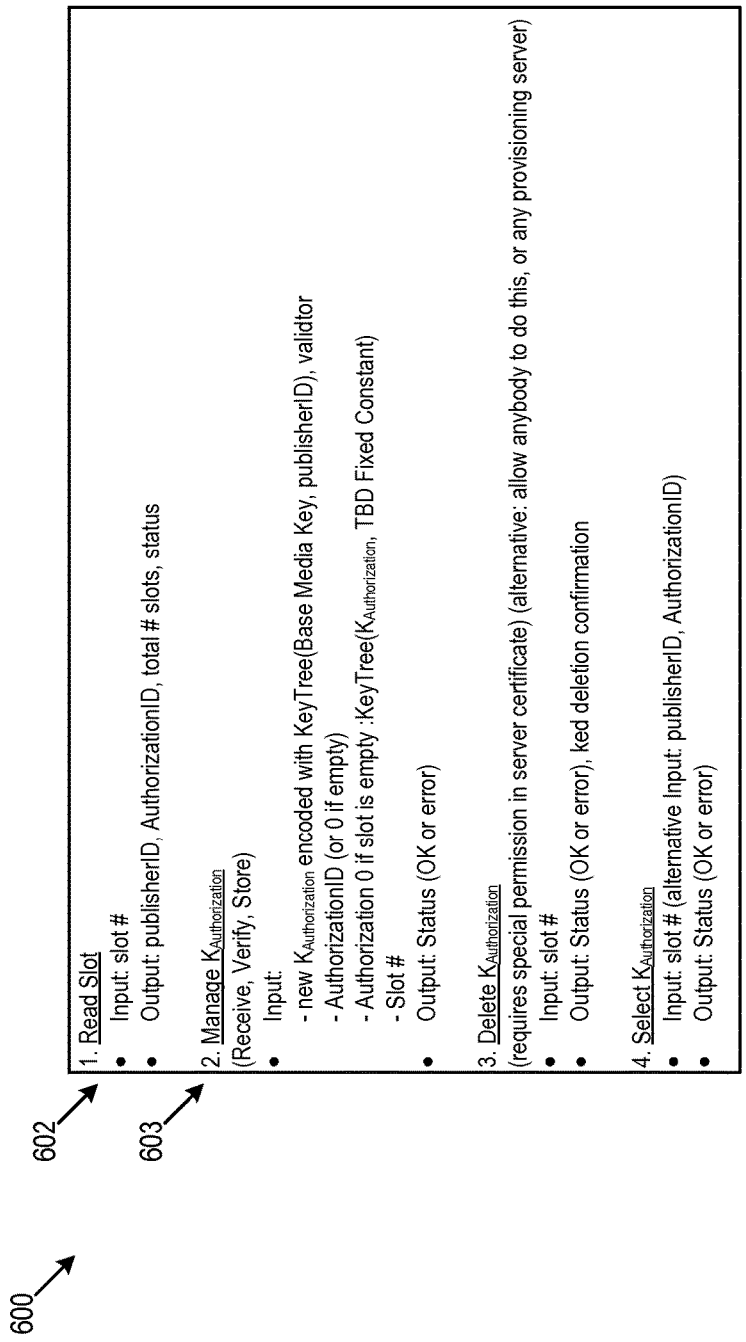
FIG. 6 illustrates example key management instructions for protecting a media item using a media security controller, according to various implementations.

The security module 507 on the rendering device 505 reads (520) an entry in a playback map 565 that is stored in the rendering device 505. In the example shown in FIG. 5, the entry specifies that processing by the MSC 503 is required for the data. The rendering device 505 reads the data from the public storage area by issuing (521) a request (e.g., a file read) then receives (522) the required data. Part or all of the data is then sent 523 to the MSC 503 with a request that designates the processing required (e.g., how the MSC 503 should decrypt the data). The MSC 503 performs (524) the requested processing and returns (525) the result back to the rendering device 505. The rendering device 505 can perform further processing (526) of its own, such as using the MSC 503 to apply an additional decryption pass on the data. Finally, the data is ready to be rendered. The rendering device decodes 527 the video/audio, e.g. by sending portion(s) of the data to audio or video codecs for decompression and output FIG. 6 illustrates example key management commands 600 for protecting authorization keys in a media security controller, according to various implementations. Such keys can be used to secure the removal and transfer of authorizations, e.g. if an authorization is to be transferred from one media device to another, the process can consist of: (1) disabling the authorization key on the source device, (2) confirming to an authorization server that the key is disabled, (3) the authorization server issuing a new authorization file and new authorization key for the destination media device. Authorization keys can also help verify that the content is properly authorized, e.g. to help prevent duplication of authorizations (since only the authorized media device should have the correct authorization key). The key management commands 600 can be used, for example, by a server, rendering device, etc. For example, an authorization server (e.g., authorization server 110 in FIG. 1) can use one or more of the key management commands to provision authorization keys to MSCs and to manage the authorization keys that are stored by the MSCs.

For example, when a media item is purchased, the authorization server can send an authorization file for the media item, a data file for the media item, and an authorization key corresponding to the media item to the media storage device. The authorization server can also send a "Manage $K_{Authorization}$" command 603 to the MSC on the media storage device. This command 603 can direct the MSC to receive, verify, and store a specified authorization key. For example, the manage command 603 may specify to the MSC the authorization key to store, the authorization identifier to store, and the slot number to use to store the authorization key, and other authorization-related information.

In this example, a rendering device may use one or more of the key management commands 600 as part of the playback process. For example, a rendering device (e.g., rendering device 160 in FIG. 1) may use the use the "Read Slot" command 602 to verify that there is already an authorization key in the MSC for a particular media item. During the playback process, the instructions performed by the MSC (e.g. such as those in part of 430 in FIG. 4, or the processing in connection with playback entries such as 524 in FIG. 5) can utilize the authorization key, e.g. to ensure that playback cannot be performed on unauthorized media or media from which the authorization has been removed.

The authorization servers can establish secure communications with the MSCs. A key issuance server can issue base media storage device keys to the MSCs. In one implementation the key issuance server uses a key tree to create a derived list of keys that are derived from the base media storage device keys that are issued to the MSCs. The key issuance server can provide the list of derived keys to the authorization server. The authorization server can have secure communications with the MSCs using the list of derived keys. The use of the derived keys allows the authorization server to securely communicate with the MSCs without actually having knowledge of the base media storage device keys that are assigned to the MSCs (e.g., to prevent the compromise of one authorization server from compromising operations performed by the media and other authorization servers).

In one implementation the key issuance server creates the derived keys using a key tree function that has, as inputs, the base media storage device keys that are assigned to the MSCs and the publisher identifiers associated with the authorization servers. For example, the derived keys may be computed with input parameters of (base media storage device key, publisherID). The derived keys can be shared between the corresponding MSC and authorization server. The individual content providers (e.g., publishers) can receive a list of derived keys which allows communications between the authorization servers of the content providers and the MSCs.

Figure 7:
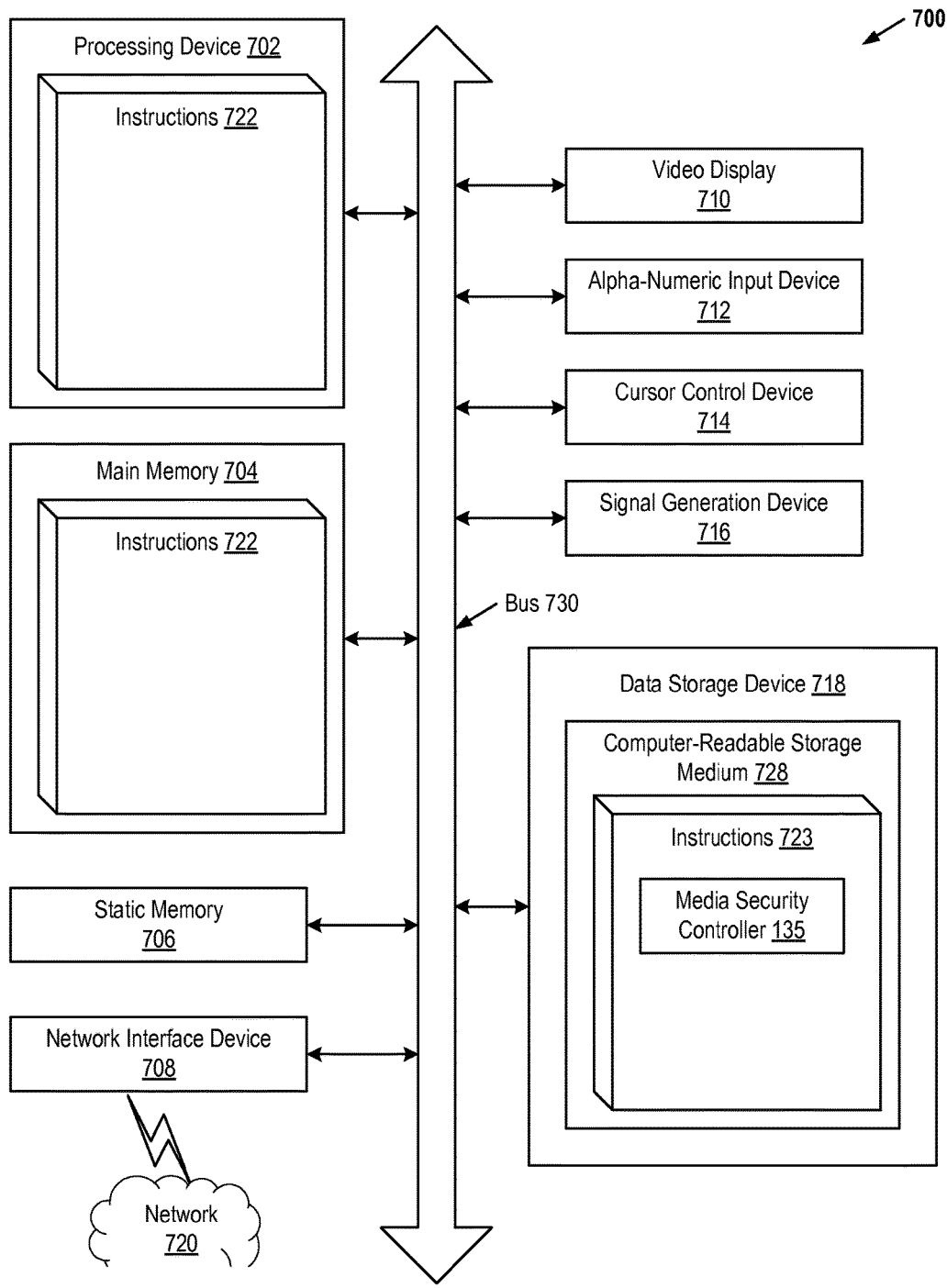
FIG. 7 is a block diagram of an example computer system that may perform one or more of the operations of a media security controller described herein, in accordance with various implementations.
Figure 8:
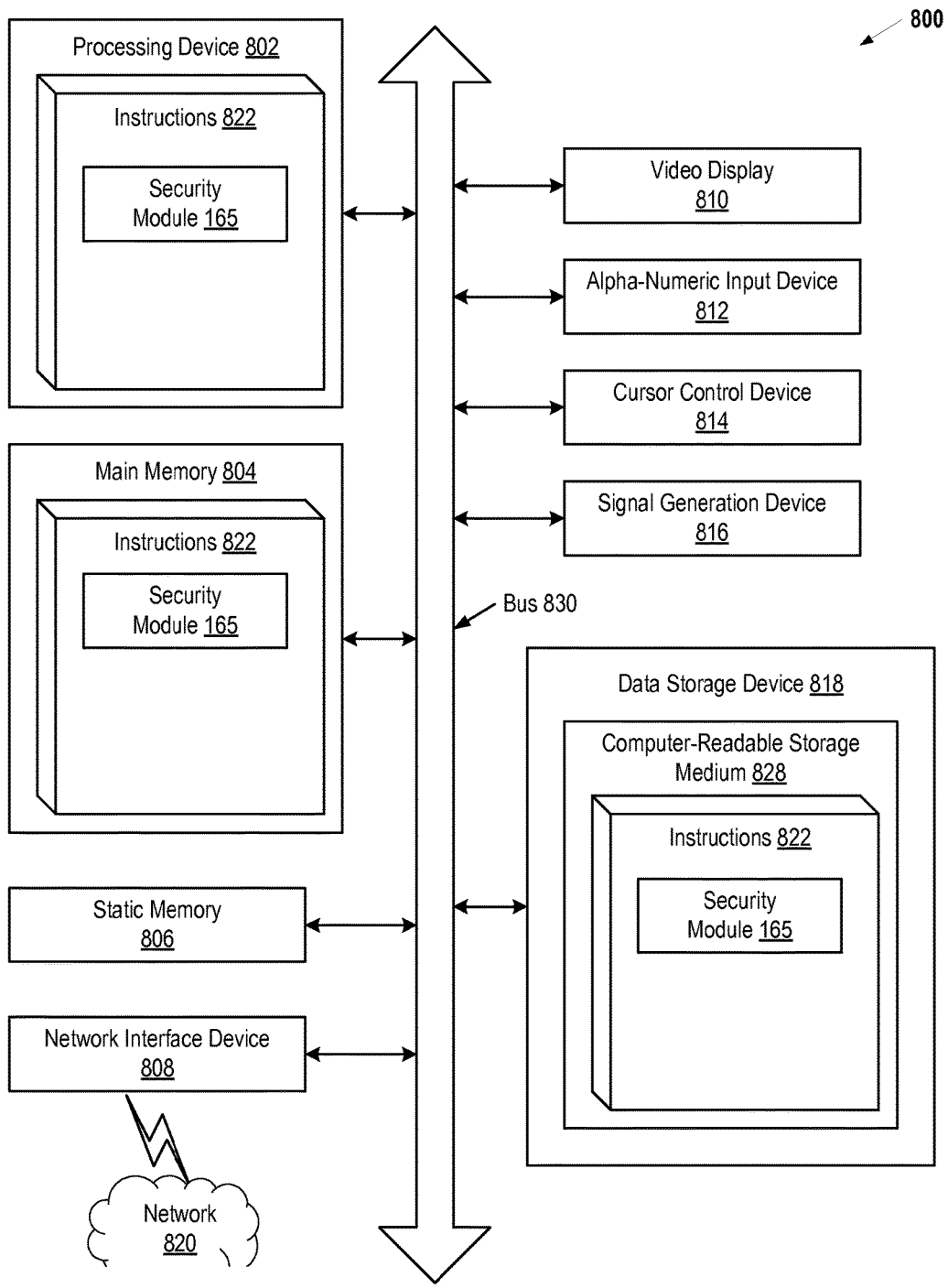
FIG. 8 is a block diagram of an example computer system that may perform one or more of the operations of a security module described herein, in accordance with various implementations.

FIG. 7, described in greater detail below, is a block diagram of an example computer system that is configured to perform one or more of the operations of a media security controller described herein, in accordance with various implementations. FIG. 8, described in greater detail below, is a block diagram of an example computer system that is configured to perform one or more of the operations of a security module described herein, in accordance with various implementations. In some embodiments, the computer systems of FIG. 7 and FIG. 8 are embodied in a single system configured to perform both the operations of a media security controller and a security module.

FIG. 7 illustrates a diagram of a machine in an example form of a computer system 700 within which a set of instructions, for causing the machine to perform any one or more of the methodologies of a media security controller discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines, chips, and/or microprocessors that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 614, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor (including without limitation an embedded CPU core running the ARM or MIPS instruction set), very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 722 for performing operations and steps discussed herein. The instructions 722 may also reside, completely or at least partially, within the main memory 704 and/or within the processor 702 during execution thereof by the computer system 700, the main memory 704 and the processor 702 also constituting computer-readable storage media. The instructions 722 may further be transmitted or received over a network 720 via the network interface device 708. Instructions 722 (or other instructions associated with the present invention) may be digitally signed (or otherwise cryptographically authenticated), and verified prior to execution (e.g. by processor 702).

The computer system 700 may further include a network interface device 708. The computer system 700 also may include a video display unit 710 (e.g., a liquid crystal display (LCD) or a cathode ray tube (CRT)), an input device 712 (e.g., a keypad, a touchscreen, an alphanumeric keyboard, a motion sensing input device, etc.), a cursor control device 714 (e.g., a mouse), and/or a signal generation device 716 (e.g., a speaker).

The data storage device 718 may include a computer-readable storage medium 728 on which is stored one or more sets of instructions 723 (e.g., software) embodying any one or more of the methodologies or functions of a media security controller described herein. In one implementation, the data storage device 718 may include a computer-readable storage medium 728 on which is stored one or more sets of instructions 723 embodying any one or more of the methodologies or functions of a media security controller module described herein. While the computer-readable storage medium 728 (machine-readable storage medium) is shown in an exemplary implementation to be a single medium, the term "computer-readable storage medium" should be taken to include a single medium or multiple media (e.g., RAID array, network-attached storage device, flash memories, a centralized or distributed database, and/or associated caches and servers, etc.) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

FIG. 8 illustrates a diagram of a machine in an example form of a computer system 800 within which a set of instructions, for causing the machine to perform any one or more of the methodologies of a security module discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines, chips, and/or microprocessors that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor (including without limitation an embedded CPU core running the ARM or MIPS instruction set), very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 822 for performing operations and steps discussed herein. Processor 802, or other hardware and/or software in the system, implements the capabilities of the security module 165.

The computer system 800 may further include a network interface device 808. The computer system 800 also may include a video display unit 810 (e.g., a liquid crystal display (LCD) or a cathode ray tube (CRT)), an input device 812 (e.g., a keypad, a touchscreen, an alphanumeric keyboard, a motion sensing input device, etc.), a cursor control device 814 (e.g., a mouse), and/or a signal generation device 816 (e.g., a speaker).

In one implementation, the data storage device 818 may include a computer-readable storage medium 828 on which is stored one or more sets of instructions 822 (e.g., software) embodying any one or more of the methodologies or functions of a security module described herein. The instructions 822 may also reside, completely or at least partially, within the main memory 804 and/or within the processor 802 during execution thereof by the computer system 800, the main memory 804 and the processor 802 also constituting computer-readable storage media. The instructions 822 may further be transmitted or received over a network 820 via the network interface device 808.

In one implementation, the instructions 822 include instructions for a security module (e.g., security module 165 in FIG. 1), and/or a software library containing methods that call the security module. While the computer-readable storage medium 828 (machine-readable storage medium) is shown in an exemplary implementation to be a single medium, the term "computer-readable storage medium" should be taken to include a single medium or multiple media (e.g., RAID array, network-attached storage device, flash memories, a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In various embodiments, media connects to the rendering device via, for example, and not limited to, USB, SD/SDHC/SDXC/etc., SCSI, SATA, and Ethernet protocols. The connection may be wired or wireless. Any file system can be used on the storage device, including FAT32, NFS, NTFS, RiserFS, etc. The communications involving "special" secured transactions can be handled via out-of-band control operations, or integrated with the bulk data transfer operations that are part of legacy file system operation. Media devices that implement this system can be fully backward compatible, e.g. ordinary consumer hard drives, flash cards, USB drives. Likewise, rendering devices that implement this can support other playback methods as well, such as Internet streaming, playback from optical drives, etc.]

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "sending", "receiving", "transforming", "decrypting", "encrypting", "compressing", "performing", "establishing", "creating", "rendering", "processing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The following examples pertain to further embodiments.

Example 1 is an apparatus for protecting a media item using a media security controller comprising 1) a memory to store a media item and data relating to rendering the media item by a rendering device; and 2) a media security controller comprising a processing device coupled to the memory to send to a rendering device, in response to the rendering device reading an authorization file, a message for the rendering device to read a portion of the data from the memory and to provide the portion of data to the media security controller, receive the portion of the data from the rendering device, transform the portion of the data, and send the transformed portion of the data to the rendering device.

In Example 2, the transformed portion of the data in the subject matter of Example 1 can optionally comprise data for the rendering device to render the media item.

In Example 3, the media security controller in the subject matter of Example 1 can optionally transform the portion of the data by at least one of decrypting the portion of the data, encrypting the portion of the data, or compressing the portion of the data.

In Example 4, the media security controller in the subject matter of Example 1 can optionally further comprises a second memory to store an authorization key corresponding to the transformed portion of the data.

In Example 5, the processing device in the subject matter of Example 4 can optionally further decrypt the portion of the data using the authorization key.

In Example 6, the media security controller in the subject matter of Example 1 can optionally perform a first handshake with the rendering device based on public key infrastructure cryptography, perform a second handshake with the rendering device based on symmetric key cryptography, and establish a secure session with the rendering device based on the first handshake and the second handshake.

In Example 7, the media security controller in the subject matter of Example 1 can optionally transform the portion of the data by receiving a set of instructions specifying an authorization key for transforming the portion of the data, wherein the set of instructions enable forensic analysis to identify the media security controller to a third party, and creating the transformed portion of the data using the authorization key, wherein the transformed portion of the data identifies the media security controller to the third party.

In Example 8, the media security controller in the subject matter of Example 1 can optionally synchronize a first certificate revision list of the media security controller with a second certificate revision list of the rendering device, wherein the first certificate revision list and the second certificate revision list describe one or more changes to a set of rights.

Various embodiments may have different combinations of the operational features described above. For instance, all optional features of the apparatus described above may also be implemented with respect to the method or process described herein and specifics in the examples may be used anywhere in one or more embodiments.

Example 9 is a method for protecting a media item using a media security controller comprising 1) sending to a rendering device, by the media security controller in response to the rendering device reading an authorization file, a message for the rendering device to read a portion of data from a memory of a media storage device and to provide the portion of the data to the media security controller, wherein the data in the memory of the media storage device relates to a media item to be rendered by the rendering device; 2) receiving from the rendering device, by the media security controller, the portion of the data; 3) transforming, by the media security controller, the portion of the data; and 4) sending to the rendering device, by the media security controller, the transformed portion of the data.

In Example 10, the transformed portion of the data in the subject matter of Example 9 can optionally comprise data for the rendering device to render the media item.

In Example 11, the transforming of the portion of the data in the subject matter of Example 9 can optionally comprise at least one of decrypting the portion of the data, encrypting the portion of the data, or compressing the portion of the data.

In Example 12, the media security controller in the subject matter of Example 9 can optionally comprise a second memory to store an authorization key corresponding to the transformed portion of the data.

In Example 13, the transforming of the portion of data in the subject matter of Example 12 can optionally comprise decrypting, by the media security controller, the portion of the data using the authorization key.

In Example 14, the subject matter of Example 9 can optionally further comprise performing a first handshake between the media security controller and the rendering device based on public key infrastructure cryptography, performing a second handshake between the media security controller and the rendering device based on symmetric key cryptography, and establishing a secure session with the rendering device based on the first handshake and the second handshake.

In Example 15, the transforming of the portion of data in the subject matter of Example 9 can optionally comprise receiving, by the media security controller, a set of instructions specifying an authorization key for transforming the portion of the data, wherein the set of instruction enable forensic analysis to identify the media security controller to a third party, and creating, by the media security controller, the transformed portion of the data using the authorization key, wherein the transformed portion of data identifies the media security controller to the third party.

In Example 16, the subject matter of Example 9 can optionally further comprise synchronizing a first certificate revision list of the media security controller with a second certificate revision list of the rendering device, wherein the first certificate revision list and the second certificate revision list describe one or more changes to a set of rights.

Various embodiments may have different combinations of the operational features described above. For instance, all optional features of the method described above may also be implemented with respect to a non-transitory, computer-readable storage medium. Specifics in the examples may be used anywhere in one or more embodiments.

Examples 17-24 are a non-transitory, computer-readable storage medium including instructions that, when executed by a computing system, cause the computing system to perform the operations of Examples 9-16.

Various embodiments may have different combinations of the operational features described above. For instance, all optional features of the method described above may also be implemented with respect to an apparatus. Specifics in the examples may be used anywhere in one or more embodiments.

Examples 25-32 are a system for protecting a media item using a media security controller comprising means for executing the operations of Examples 9-16.

Example 33 is an apparatus for protecting a media item using a media security controller comprising 1) a memory to store data to render the media item; and 2) a processing device coupled to the memory to receive a message, from the media security controller in response to the processing device reading an authorization file, to read a portion of the data from the memory and to provide the portion of the data to the media security controller, send the portion of the data to the media security controller, and receive a transformed portion of the data from the media security controller.

In Example 34, the processing device in the subject matter of Example 33 can optionally further create a playback map based on the transformed portion of the data received from the media security controller, wherein the playback map comprises data to render the media item.

In Example 35, the processing device in the subject matter of Example 33 can optionally further render the media item based on the transformed portion of the data received from the media security controller.

In Example 36, the processing device in the subject matter of Example 33 can optionally further process the transformed portion of the data using a session key that is shared with the media storage device.

In Example 37, the processing device in the subject matter of Example 36 can optionally process the transformed portion of the data by at least one of decrypting the transformed portion of the data, encrypting the transformed portion of the data, or compressing the transformed portion of the data. In Example 38, the processing device in the subject matter of Example 33 can optionally further perform a first handshake with the media security controller based on public key infrastructure cryptography; perform a second handshake with the media security controller based on symmetric key cryptography; and establish a secure session with the media security controller based on the first handshake and the second handshake.

In Example 39, the processing device in the subject matter of Example 33 can optionally further synchronize a first certificate revision list of the with a second certificate revision list of the media security controller, wherein the first certificate revision list and the second certificate revision list describe one or more changes to a set of rights.

Various embodiments may have different combinations of the operational features described above. For instance, all optional features of the apparatus described above may also be implemented with respect to the method or process described herein and specifics in the examples may be used anywhere in one or more embodiments.

Example 40 is a method for protecting a media item using a media security controller comprising 1) receiving, by a rendering device, a message from the media security controller in response to the rendering device reading an authorization file, the message instructing the rendering device to read a portion of data from a memory of a media storage device and to provide the portion of the data to the media security controller, wherein the data in the memory of the media storage device relates to a media item to be rendered by the rendering device; 2) sending, by the rendering device, the portion of the data to the media security controller; and 3) receiving, by the rendering device, a transformed portion of the data from the media security controller.

In Example 41, the subject matter of Example 40 can optionally further comprise creating a playback map based on the transformed portion of the data received from the media security controller, wherein the playback map comprises data to render the media item.

In Example 42, the subject matter of Example 40 can optionally further comprise rendering the media item based on the transformed portion of the data received from the media security controller.

In Example 43, the subject matter of Example 40 can optionally further comprise processing the transformed portion of the data using a session key that is shared with the media storage device.

In Example 44, the processing of the transformed portion of the data in the subject matter of Example 43 can optionally comprise at least one of decrypting the transformed portion of the data, encrypting the transformed portion of the data, or compressing the transformed portion of the data.

In Example 45, the subject matter of Example 40 can optionally further comprise performing a first handshake with the media security controller based on public key infrastructure cryptography, perform a second handshake with the media security controller based on symmetric key cryptography, and establishing a secure session with the media security controller based on the first handshake and the second handshake.

In Example 46, the subject matter of Example 40 can optionally further comprise synchronizing a first certificate revision list of the rendering device with a second certificate revision list of the media security controller, wherein the first certificate revision list and the second certificate revision list describe one or more changes to a set of rights.

Various embodiments may have different combinations of the operational features described above. For instance, all optional features of the method described above may also be implemented with respect to a non-transitory, computer-readable storage medium. Specifics in the examples may be used anywhere in one or more embodiments.

Examples 47-53 are a non-transitory, computer-readable storage medium including instructions that, when executed by a computing system, cause the computing system to perform the operations of Examples 40-46.

Various embodiments may have different combinations of the operational features described above. For instance, all optional features of the method described above may also be implemented with respect to an apparatus. Specifics in the examples may be used anywhere in one or more embodiments.

Examples 54-60 are a system for protecting a media item using a media security controller comprising means for executing the operations of Examples 40-46.

Example 61 is an apparatus for revising rights defined in a certificate comprising 1) a memory to store a certificate; and 2) a processing device coupled to the memory to identify a set of rights in a certificate, identify a change to the set of rights, create a certificate revision list describing the change to the set of rights, and distribute the certificate revision list.

In Example 62, the change in the subject matter of Example 61 can optionally pertain to a level of quality for rendering a media item.

In Example 63, the set of rights in the subject matter of Example 61 can optionally describe one or more rights assigned to at least one of a media security controller or a rendering device.

In Example 64, the certificate revision list in the subject matter of Example 61 can optionally comprise a version identifier.

Various embodiments may have different combinations of the operational features described above. For instance, all optional features of the apparatus described above may also be implemented with respect to the method or process described herein and specifics in the examples may be used anywhere in one or more embodiments.

Example 65 is a method for revising rights defined in a certificate comprising 1) identifying a set of rights in a certificate; 2) identifying a change to the set of rights; 3) creating, by a computer system, a certificate revision list describing the change to the set of rights; and 4) distributing the certificate revision list.

In Example 66, the change in the subject matter of Example 65 can optionally pertain to a level of quality for rendering a media item.

In Example 67, the set of rights in the subject matter of Example 65 can optionally describe one or more rights assigned to at least one of a media security controller or a rendering device.

In Example 68, the certificate revision list in the subject matter of Example 65 can optionally comprise a version identifier.

Various embodiments may have different combinations of the operational features described above. For instance, all optional features of the method described above may also be implemented with respect to a non-transitory, computer-readable storage medium. Specifics in the examples may be used anywhere in one or more embodiments.

Examples 69-72 are a non-transitory, computer-readable storage medium including instructions that, when executed by a computing system, cause the computing system to perform the operations of Examples 65-68.

Various embodiments may have different combinations of the operational features described above. For instance, all optional features of the method described above may also be implemented with respect to an apparatus. Specifics in the examples may be used anywhere in one or more embodiments.

Examples 73-76 are a system for revising rights defined in a certificate comprising means for executing the operations of Examples 65-68.

Example 77 is an apparatus for revising rights of a device using a certificate revision list comprising 1) a memory to store a certificate; and 2) a processing device coupled to the memory to identify the device to perform an action pertaining to rendering a media item, identify a certificate describing a set of rights that are assigned to the device, identify a change to the set of rights in the certificate revision list, and allow the device to perform the action to render the media item based on the change in the certificate revision list.

In Example 78, the processing device in the subject matter of Example 77 can optionally further determine whether the certificate revision list is outdated and receive a current certificate revision list based on a determination that the certificate revision list is outdated.

In Example 79, the change in the subject matter of Example 77 can optionally pertain to a level of quality for rendering a media item.

In Example 80, the set of rights in the subject matter of Example 77 can optionally describe one or more rights assigned to at least one of a media security controller or a rendering device.

In Example 81, the certificate revision list in the subject matter of Example 77 can optionally comprise a version identifier.

Various embodiments may have different combinations of the operational features described above. For instance, all optional features of the apparatus described above may also be implemented with respect to the method or process described herein and specifics in the examples may be used anywhere in one or more embodiments.

Example 82 is a method for revising rights of a device using a certificate revision list comprising 1) identifying a device to perform an action pertaining to rendering a media item; 2) identifying a certificate describing a set of rights that are assigned to the device; 3) identifying a change to the set of rights in a certificate revision list; and 4) allowing the device to perform the action to render the media item based on the change in the certificate revision list.

In Example 83, the subject matter of Example 82 can optionally further comprise determining whether the certificate revision list is outdated and receiving a current certificate revision list based on a determination that the certificate revision list is outdated.

In Example 84, the change in the subject matter of Example 82 can optionally pertain to a level of quality for rendering a media item.

In Example 85, the set of rights in the subject matter of Example 82 can optionally describe one or more rights assigned to at least one of a media security controller or a rendering device.

In Example 86, the certificate revision list in the subject matter of Example 82 can optionally comprise a version identifier.

Various embodiments may have different combinations of the operational features described above. For instance, all optional features of the method described above may also be implemented with respect to a non-transitory, computer-readable storage medium. Specifics in the examples may be used anywhere in one or more embodiments.

Examples 87-91 are a non-transitory, computer-readable storage medium including instructions that, when executed by a computing system, cause the computing system to perform the operations of Examples 82-86.

Various embodiments may have different combinations of the operational features described above. For instance, all optional features of the method described above may also be implemented with respect to an apparatus. Specifics in the examples may be used anywhere in one or more embodiments.

Examples 92-96 are a system for revising rights of a device using a certificate revision list comprising means for executing the operations of Examples 82-86.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

What is claimed is:

1. A method comprising:
   receiving, by a media security controller of a media storage device from a rendering device, a request to render a media item that is stored in a memory of the media storage device, wherein the media security controller is hardware integrated within the media storage device;
   sending to the rendering device, by the media security controller in response to receiving the request, an authorization file stored in memory of the media storage device, the authorization file comprising first instructions to be executed by the media security controller and second instructions to be executed by the rendering device to render the media item;
   receiving, by the media security controller, at least a portion of the authorization file from the rendering device, wherein the portion of the authorization file comprises the first instructions;
   executing, by the media security controller, the first instructions to send to the rendering device a message for the rendering device to obtain a portion of data from the memory of the media storage device and to provide the portion of the data to the media security controller of the media storage device, wherein the data in the memory of the media storage device relates to the media item to be rendered by the rendering device, wherein the data in the memory of the media storage device is stored according to a file system unknown to the media security controller;
   receiving from the rendering device, by the media security controller of the media storage device, the portion of the data obtained by the rendering device from the memory of the media storage device;
   transforming, by the media security controller of the media storage device, the portion of the data obtained by the rendering device from the memory of the media storage device; and
   sending to the rendering device, by the media security controller of the media storage device, the transformed portion of the data.

2. The method of claim 1, wherein the transformed portion of the data comprises data for the rendering device to render the media item.

3. The method of claim 1, wherein transforming the portion of the data comprises at least one of decrypting the portion of the data, encrypting the portion of the data, or compressing the portion of the data.

4. The method of claim 1, wherein the media security controller comprises a second memory to store an authorization key corresponding to the transformed portion of the data, and wherein transforming the portion of the data comprises:
   decrypting, by the media security controller, the portion of the data using the authorization key.

5. The method of claim 1, further comprising:
performing a first handshake between the media security controller and the rendering device based on public key infrastructure cryptography;
performing a second handshake between the media storage device and the rendering device based on symmetric key cryptography; and
establishing a secure session with the rendering device based on the first handshake and the second handshake.

6. The method of claim 1, wherein transforming the portion of the data comprises:
receiving, by the media security controller, a set of instructions as part of the first instructions, the set of instructions specifying an authorization key for transforming the portion of the data, wherein the set of instructions enable forensic analysis to identify the media security controller to a third party; and
creating, by the media security controller, the transformed portion of the data using the authorization key, wherein the transformed portion of the data identifies the media security controller to the third party.

7. The method of claim 1, further comprising:
synchronizing a first certificate revision list of the media security controller with a second certificate revision list of the rendering device, wherein the first certificate revision list and the second certificate revision list describe one or more changes to a set of rights.

8. A method comprising:
sending, by a rendering device, a request to render a media item that is stored in a memory of a media storage device;
receiving, by the rendering device, an authorization file stored in the memory of the media storage device, the authorization file comprising first instructions to be executed by a media security controller of the media storage device and second instructions to be executed by the rendering device to render the media item, wherein the media security controller is hardware integrated within the media storage device;
receiving, by the rendering device, a message from the media security controller, the message instructing the rendering device to read a portion of data from the memory of the media storage device and to provide the portion of the data to the media security controller of the media storage device, wherein the data in the memory of the media storage device relates to the media item to be rendered by the rendering device, wherein the data in the memory of the media storage device is stored according to a file system unknown to the media security controller;
sending, by the rendering device, the portion of the data read from the memory of the media storage device to the media security controller of the media storage device; and
receiving, by the rendering device, a transformed portion of the data from the media security controller of the media storage device.

9. The method of claim 8, further comprising:
creating a playback map based on the transformed portion of the data received from the media security controller, wherein the playback map comprises data to render the media item.

10. The method of claim 8, further comprising:
rendering the media item based on the transformed portion of the data received from the media security controller.

11. The method of claim 8, further comprising:
processing the transformed portion of the data using a session key that is shared with the media storage device, wherein processing comprises at least one of decrypting the transformed portion of the data, encrypting the transformed portion of the data, or compressing the transformed portion of the data.

12. The method of claim 8, further comprising:
performing a first handshake between the media storage device and the rendering device based on public key infrastructure cryptography;
performing a second handshake between the media storage device and the rendering device based on symmetric key cryptography; and
establishing a secure session with the media security controller based on the first handshake and the second handshake.

13. The method of claim 8, further comprising:
synchronizing a first certificate revision list of the rendering device with a second certificate revision list of the media security controller, wherein the first certificate revision list and the second certificate revision list describe one or more changes to a set of rights.

14. An apparatus comprising:
a first memory to store a media item and an authorization file; and
a media security controller coupled to the first memory and integrated within a media storage device, the media security controller comprising a processing device to:
receive a request from a rendering device to render the media item;
send the authorization file to the rendering device, the authorization file comprising first instructions to be executed by the media security controller and second instructions to be executed by the rendering device to render the media item;
receive at least a portion of the authorization file from the rendering device, wherein the portion of the authorization file comprises the first instructions;
execute the first instructions to send to the rendering device, a message for the rendering device to obtain a portion of data from the first memory of the media storage device and to provide the portion of the data to the media security controller of the media storage device, wherein the data in the first memory of the media storage device relates to the media item to be rendered by the rendering device, wherein the data in the first memory of the media storage device is stored according to a file system unknown to the media security controller;
receive, from the rendering device, the portion of the data obtained by the rendering device from the first memory of the media storage device;
transform the portion of the data obtained by the rendering device from the first memory of the media storage device; and
send the transformed portion of the data to the rendering device.

15. The apparatus of claim 14, wherein the transformed portion of the data comprises data for the rendering device to render the media item.

16. The apparatus of claim 14, wherein the media security controller is to transform the portion of the data by at least one of decrypting the portion of the data, encrypting the portion of the data, or compressing the portion of the data.

17. The apparatus of claim 14, wherein the media security controller further comprises a second memory to store an authorization key corresponding to the transformed portion of the data, and wherein the media security controller is further to:
  decrypt the portion of the data using the authorization key.

18. The apparatus of claim 14, wherein the media security controller is further to:
  perform a first handshake between the media security controller and the rendering device based on public key infrastructure cryptography;
  perform a second handshake between the media security controller and the rendering device based on symmetric key cryptography; and
  establish a secure session with the rendering device based on the first handshake and the second handshake.

19. The apparatus of claim 14, wherein the media security controller is to transform the portion of the data by:
  receiving a set of instructions as part of the first instructions, the set of instructions specifying an authorization key for transforming the portion of the data, wherein the set of instructions enable forensic analysis to identify the media security controller to a third party; and
  creating the transformed portion of the data using the authorization key, wherein the transformed portion of the data identifies the media security controller to the third party.

20. The apparatus of claim 14, wherein the media security controller is further to:
  synchronize a first certificate revision list of the media security controller with a second certificate revision list of the rendering device, wherein the first certificate revision list and the second certificate revision list describe one or more changes to a set of rights.

21. An apparatus comprising:
  a first memory to store data to render a media item; and
  a processing device coupled to the first memory to:
    send a request from a rendering device to render the media item that is stored in a second memory of a media storage device;
    receive an authorization file stored in the second memory of the media storage device, the authorization file comprising first instructions to be executed by a media security controller of the media storage device and second instructions to be executed by the rendering device to render the media item, wherein the media security controller is hardware integrated within the media storage device;
    receive a message, from the media security controller to read a portion of data from the second memory of the media storage device and to provide the portion of the data to the media security controller of the media storage device, wherein the data in the second memory of the media storage device relates to the media item to be rendered by the processing device, wherein the data in the second memory of the media storage device is stored according to a file system unknown to the media security controller;
    send the portion of the data read from the second memory of the media storage device to the media security controller of the media storage device; and
    receive a transformed portion of the data from the media security controller of the media storage device.

22. The apparatus of claim 21, wherein the processing device is further to:
  create a playback map based on the transformed portion of the data received from the media security controller, wherein the playback map comprises data to render the media item.

23. The apparatus of claim 21, wherein the processing device is further to:
  render the media item based on the transformed portion of the data received from the media security controller.

24. The apparatus of claim 21, wherein the processing device is further to:
  process the transformed portion of the data using a session key that is shared with the media storage device, and wherein to process the transformed portion of the data comprises the processing device to at least one of decrypt the transformed portion of the data, encrypt the transformed portion of the data, or compress the transformed portion of the data.

25. The apparatus of claim 21, wherein the processing device is further to:
  perform a first handshake with the media security controller based on public key infrastructure cryptography;
  perform a second handshake with the media security controller based on symmetric key cryptography; and
  establish a secure session with the media security controller based on the first handshake and the second handshake.

26. The apparatus of claim 21, wherein the processing device is further to:
  synchronize a first certificate revision list of the with a second certificate revision list of the media security controller, wherein the first certificate revision list and the second certificate revision list describe one or more changes to a set of rights.

27. A non-transitory computer-readable storage medium including instructions that, when executed by a processing device integrated within a media storage device, cause the processing device to perform operations comprising:
  receiving, by a media security controller of a media storage device from a rendering device, a request to render a media item that is stored in a memory of the media storage device, wherein the media security controller is hardware integrated within the media storage device;
  sending to the rendering device, by the media security controller in response to receiving the request, an authorization file stored in memory of the media storage device, the authorization file comprising first instructions to be executed by the media security controller and second instructions to be executed by the rendering device to render the media item;
  receiving, by the media security controller, at least a portion of the authorization file from the rendering device, wherein the portion of the authorization file comprises the first instructions;
  executing, by the media security controller, the first instructions to send to the rendering device a message for the rendering device to obtain a portion of data from the memory of the media storage device and to provide the portion of the data to the processing device of the media storage device, wherein the data in the memory of the media storage device relates to a media item to be rendered by the rendering device, wherein the data in the memory of the media storage device is stored according to a file system unknown to the processing device;
  receiving from the rendering device, by the processing device of the media storage device, the portion of the data obtained by the rendering device from the memory of the media storage device;

transforming, by the processing device of the media storage device, the portion of the data obtained by the rendering device from the memory of the media storage device; and sending to the rendering device, by the processing device of the media storage device, the transformed portion of the data.

28. The non-transitory computer-readable storage medium of claim 27, the operations further comprising:

synchronizing a first certificate revision list of the media storage device with a second certificate revision list of the rendering device, wherein the first certificate revision list and the second certificate revision list describe one or more changes to a set of rights.

29. A non-transitory computer-readable storage medium including instructions that, when executed by a processing device in a rendering device, cause the processing device to perform operations comprising:

sending, by the processing device, a request to render a media item that is stored in a memory of a media storage device;

receiving, by the processing device, an authorization file stored in the memory of the media storage device, the authorization file comprising first instructions to be executed by a media security controller integrated within the media storage device and second instructions to be executed by the rendering device to render the media item;

receiving, by the processing device, a message from the media security controller, the message instructing the processing device to read a portion of data from the memory of the media storage device and to provide the portion of the data to the media security controller of the media storage device, wherein the data in the memory of the media storage device relates to the media item to be rendered by the processing device, wherein the data in the memory of the media storage device is stored according to a file system unknown to the media security controller;

sending, by the processing device, the portion of the data read from the memory of the media storage device to the media security controller of the media storage device; and receiving, by the processing device, a transformed portion of the data from the media security controller of the media storage device.

30. The non-transitory computer-readable storage medium of claim 29, the operations further comprising:

creating a playback map based on the transformed portion of the data received from the media security controller, wherein the playback map comprises data to render the media item.

\* \* \* \* \*